United States Patent [19]

Forschner et al.

[11] Patent Number: 5,652,331

[45] Date of Patent: Jul. 29, 1997

[54] METHOD FOR PREPARING POLY-P-DIOXANONE POLYMER

[75] Inventors: Thomas Clayton Forschner, Richmond; David Eric Gwyn; Cary Alan Veith, both of Houston, all of Tex.

[73] Assignee: Shell Oil Company, Houston, Tex.

[21] Appl. No.: 697,805

[22] Filed: Aug. 30, 1996

[51] Int. Cl.$^6$ .................................................. C08G 63/08
[52] U.S. Cl. ........................ 528/354; 528/357; 528/298; 528/403; 528/409; 528/486; 528/503; 525/411; 525/415; 525/461; 525/466
[58] Field of Search ........................... 528/354, 357, 528/298, 403, 409, 486, 503; 525/411, 415, 461, 466

[56] References Cited

U.S. PATENT DOCUMENTS

| | | | |
|---|---|---|---|
| 4,643,191 | 2/1987 | Bezwada et al. | 128/335.5 |
| 4,653,497 | 3/1987 | Bezwada et al. | 128/335.5 |
| 5,321,113 | 6/1994 | Cooper et al. | 528/176 |

Primary Examiner—James J. Seidleck
Assistant Examiner—Duc Truong

[57] ABSTRACT

Poly-p-dioxanone is prepared in a process comprising:

(a) heating a reaction mixture comprising p-dioxanone and an effective amount of a polymerization catalyst under conditions of temperature and pressure effective to produce a reaction product mixture comprising molten poly-p-dioxanone and unreacted p-dioxanone;

(b) adding to said reaction product mixture a cyclic anhydride under conditions effective for reaction of the poly-p-dioxanone with the cyclic anhydride to form an end-capped poly-p-dioxanone;

(c) exposing the reaction product mixture to a temperature within the range of about 50 to about 150° C. under reduced pressure and removing unreacted p-dioxanone from the reaction product mixture; and (d) recovering the end-capped poly-p-dioxanone.

The invention process permits the economical production of high molecular weight poly-p-dioxanone in the melt.

11 Claims, 1 Drawing Sheet

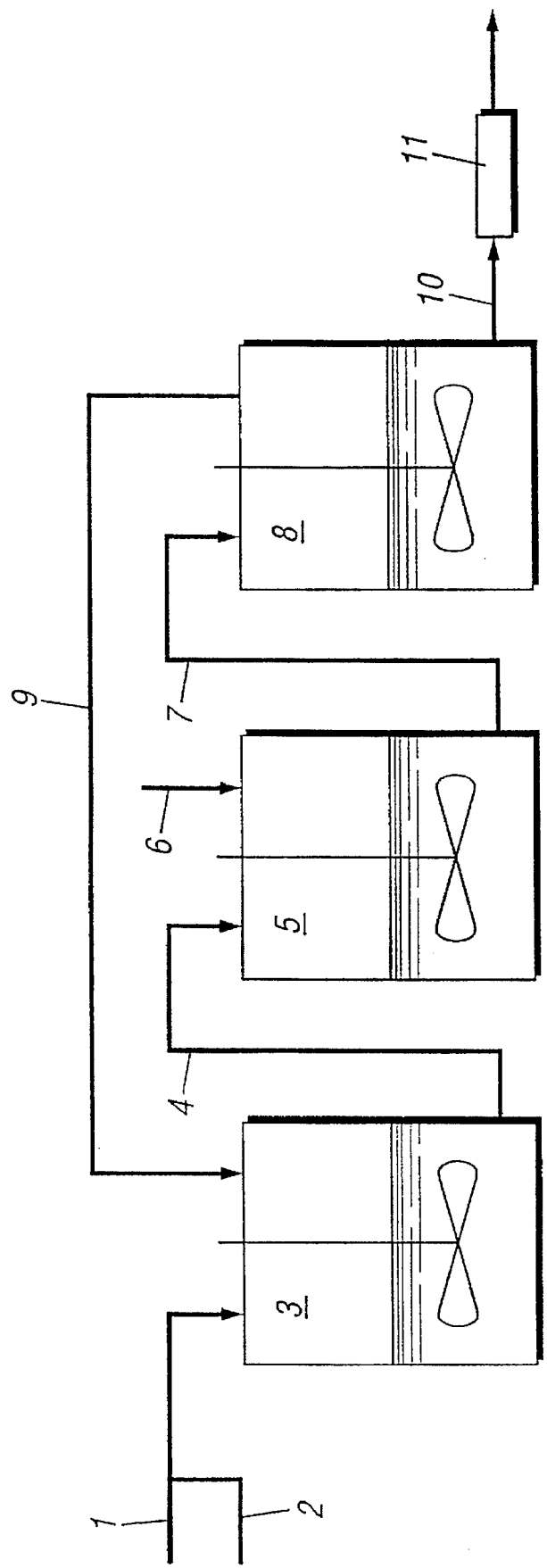

METHOD FOR PREPARING POLY-P-DIOXANONE POLYMER

BACKGROUND OF THE INVENTION

This invention relates to the preparation of poly-p-dioxanone. In a specific aspect, the invention relates to the preparation of high molecular weight poly-p-dioxanone in the melt.

p-Dioxanone is known to be readily polymerized in the solid state below the melting point (about 110° C.) of the polymer. With active polymerization catalysts such as aluminum and zinc complexes, high molecular weight polymer can be obtained with conversions of p-dioxanone monomer to polymer approaching 100%.

To permit commercial scale-up of the polymerization without adversely affecting process economics, it would be desirable to carry out the polymerization reaction in the melt rather than in the solid state. However, as a result of the dynamic chemical equilibrium between p-dioxanone and poly-p-dioxanone above the melting point of the polymer, conversion of monomer to polymer in the melt is typically limited to about 78%. Removal and recovery of unreacted monomer from the melt is difficult because of the tendency, given this dynamic equilibrium, of the polymer to degrade or lose molecular weight as the monomer is removed.

It is therefore an object of the invention to provide a process for preparing high molecular weight poly-p-dioxanone in the melt.

SUMMARY OF THE INVENTION

According to the invention, poly-p-dioxanone is prepared in a process comprising:

(a) heating a reaction mixture comprising p-dioxanone and an effective amount of a polymerization catalyst under conditions of temperature and pressure effective to produce a reaction product mixture comprising molten poly-p-dioxanone and unreacted p-dioxanone;

(b) adding to said reaction product mixture a cyclic anhydride under conditions effective to produce an end-capped poly-p-dioxanone;

(c) maintaining the reaction product mixture comprising end-capped poly-p-dioxanone under reduced pressure at a temperature within the range of about 50 to about 150° C. for a time effective for removal of a major portion of the unreacted p-dioxanone from the reaction product mixture; and (d) recovering said end-capped poly-p-dioxanone.

The invention process permits the production of high molecular weight poly-p-dioxanone in the melt.

BRIEF DESCRIPTION OF THE DRAWING

The FIGURE is a schematic flow diagram of one embodiment of the invention poly-p-dioxanone preparation process.

DETAILED DESCRIPTION OF THE INVENTION

The starting monomer for preparation of the desired high molecular weight poly-p-dioxanone is an optionally alkyl-substituted 2-p-dioxanone according to the formula

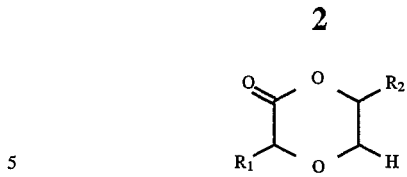

in which each of $R_1$ and $R_2$ can be H or $C_{1-3}$ alkyl. Such a monomer can be prepared, for example, by the oxidative dehydrogenation of dialkylene glycols such as diethylene glycol. To prepare high molecular weight polymer, it is desirable to use monomer which has a purity of at least about 98%. Such purity can generally be achieved by distillation to separate impurities from the monomer.

If desired for modification of polymer properties, other cyclic lactones such as lactide and glycolide can be copolymerized with the p-dioxanone. As used herein, "poly-p-dioxanone" shall refer to polymers comprising p-dioxanone monomer units and up to about 40 mole percent other cyclic lactone comonomer units.

The polymerization reaction is carried out in the presence of an effective amount of a polymerization catalyst. Suitable polymerization catalysts include, for example, organo tin compounds such as dibutyl tin oxide, dibutyl tin dilaurate and dibutyl tin di-2-ethylhexanoate (U.S. Pat. No. 3,645, 941), organozinc compounds such as diethyl zinc (U.S. Pat. No. 3,063,968) and organoaluminum compounds such as triisobutyl aluminum (U.S. Pat. No. 3,063,967). The preferred polymerization catalyst for the invention melt polymerization process is tin octoate.

The catalyst is present in the polymerization reaction mixture in an amount within the range of about 0.0001 to about 3, preferably about 0.007 to about 0.08 weight percent, based on the weight of the monomer. The polymerization reaction can be carried out at a pressure generally within the range of about 0.05 to about 5 atmospheres, preferably about 0.5 to about 2 atm. The polymerization reaction temperature is a temperature higher than the melting temperature of the target polymer. For poly-p-dioxanone, the polymerization temperature will range from about 110° to about 175° C., preferably about 120° to about 150° C. The polymerization reaction is preferably carried out in a stirred reactor vessel under an inert or reducing atmosphere such as nitrogen, argon or hydrogen. The polymerization can be carried out continuously or batchwise, in a single vessel or a series of two or more reactors. Reaction time can vary depending upon catalyst concentration, temperature, pressure and other reaction variables, but will generally range within about 0.5 to about 5 hours.

When the desired degree of polymerization has been achieved, as determined by product number average molecular weight of at least about 20,000 or by the corresponding viscosity, for example, a cyclic anhydride is added to the reaction product mixture in an amount sufficient to react with a majority of the polymer endgroups. The cyclic anhydride will generally be added in an amount of about 2 mole percent or less, preferably within the range of about 0.0001 to about 0.1 mole percent, based on the original amount of p-dioxanone monomers.

As used herein, "cyclic anhydride" refers to a compound having the chemical moiety

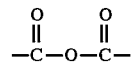

joined to an aliphatic or aromatic ring. Such compounds include pyromellitic anhydride, phthalic anhydride, maleic anhydride, diglycolic anhydride and itaconic anhydride. The currently preferred cyclic anhydride is pyromellitic anhydride.

After addition of the cyclic anhydride, the reaction product mixture is maintained under conditions suitable for the cyclic anhydride to react with the majority of the polymer endgroups present, generally a temperature within the range of about 60° to about 150° C. for a time of about 0.5 to about 3 hours. The reaction product mixture is then exposed to reduced pressure, preferably about 350 to about 0.001 torr and a temperature within the range of about 110° to about 160° C. for a time sufficient to remove p-dioxanone monomer, generally about 1 to about 5 hrs.

The end-capped poly-p-dioxanone is removed from the polymerization vessel and formed into particles such as nibs, chips, pellets and the like. Preferably, this process is carried out by pumping the molten mixture from the reactor into a screw extruder, and extruding, cooling, solidifying and then dividing the mixture into solid particles.

The poly-p-dioxanone preparation process can be described by reference to the Figure. Shown is a continuous process in which two polymerization reactors are operated in series. P-dioxanone monomer, with any desired comonomer, and the polymerization catalyst in optional solvent are introduced into stirred reactor vessel 3 via 1 and 2, respectively. The contents of the reactor are heated above the melting temperature of the desired polymer or copolymer to a monomer conversion of about 25 to about 50 mole percent.

The molten reaction product mixture containing poly-p-dioxanone, unreacted p-dioxanone and catalyst is transferred via 4 to a second stirred reactor 5, wherein polymerization is continued in the melt to greater conversion and higher molecular weight. The poly-p-dioxanone is reacted with cyclic anhydride introduced via 6 to produce an end-capped poly-p-dioxanone. The molten reaction product mixture 7 containing end-capped poly-p-dioxanone, up to about 30 weight percent p-dioxanone and catalyst residue is cooled and passed to vessel 8 wherein volatiles including unreacted p-dioxanone are removed by, for example, evaporation or distillation under reduced pressure. Unreacted monomer is recycled via 9 to the initial polymerization reactor. End-capped polymer is passed via 10 to extruder 11 for cooling and formation into pellets.

The molecular weight average of the product poly-p-dioxanone will depend upon the desired application but will typically range from about 50,000 to about 300,000.

The polymerization can be carried out in batch or continuous form.

The poly-p-dioxanone polymer prepared in the invention process can be used in coatings, films, molding powders and fibers, particularly where degradability or biodegradability is desired.

EXAMPLE 1

Polymerization of Poly-p-Dioxanone

This experiment demonstrates the problem of polymer degradation in the melt polymerization of poly-p-dioxanone.

A standard polymerization kettle was charged with 50.06 g of p-dioxanone monomer and 0.15 mL of 0.33M tin octoate in toluene. The mixture was heated to 125° C. for 5 hours and sampled for molecular weight determination. The number average molecular weight at this stage of the polymerization was 44,000.

The temperature was reduced to 110° C. and vacuum was applied for 1.5 hour to remove unreacted monomer. The polymer was then removed from the reactor and analyzed by GPC (PMMA standard in HFIPA solvent). The number average molecular weight of the polymer at this stage was 30,200, which was 31% less than the molecular weight of the polymer after melt polymerization, suggesting degradation of the polymer as a result of a shift in chemical equilibrium as the monomer was removed from the polymer/monomer mixture.

EXAMPLE 2

Polymerization of p-Dioxanone

A standard polymerization kettle was charged with 50.06 g of p-dioxanone monomer, 0.0005 mole dodecanol (as a catalyst initiator) and 0.15 ml of 0.33M tin octoate solution in toluene. The mixture was heated to 125° C. for 3 hours, and a sample was taken from molecular weight determination. GPC analysis (PMMA standard in HFIPA solvent) gave a number average molecular weight of 28,100. The temperature was then reduced to 115° C. and vacuum was applied for 2.5 hour to remove unreacted monomer. GPC analysis of the polymer showed a number average molecular weight of 10,000, indicating a significant loss of molecular weight under the vacuum.

EXAMPLE 3

Preparation of End-Capped Poly-p-Dioxanone

A polymerization kettle was charged with 120.5 of p-dioxanone monomer. A 0.55-ml aliquot of 0.2M tin octoate solution in toluene was injected into the reactor at 60° C., and the temperature was raised to 125° C. After 3 hours of stirring, the melt was thick and viscous. A sample of the melt was taken for H NMR and GPC analyses, which indicated 75% conversion of monomer to polymer with a number average molecular weight of 75,400.

7.6 mL of 0.16M pyromellitic anhydride in THF was then added and the melt was stirred for 1 hour. Vacuum was then applied and the melt was maintained at 125° C. for 5 hours under vacuum. The product was analyzed by GPC. The anhydride-capped polymer contained less than 2.7% monomer and had a number average molecular weight of 78,600.

EXAMPLE 4

Preparation of End-Capped Poly-p-Dioxanone

The procedure of Example 3 was repeated with the exception that the vacuum was applied to the melt at 125° C. for a period of 2.5 hours. Before endcapping, the melt contained 67% polymer and 33% p-dioxanone monomer. The number average molecular weight of the polymer was 81,000. After vacuum removal of the monomer from the melt, the poly-p-dioxanone contained less than 2% monomer and had a number average molecular weight of 90,000.

We claim:

1. A process for melt polymerization of p-dioxanone, the process comprising:
    (a) heating a reaction mixture comprising p-dioxanone and an effective amount of a polymerization catalyst under conditions of temperature and pressure effective to produce a reaction product mixture comprising molten poly-p-dioxanone and unreacted p-dioxanone;
    (b) adding a cyclic anhydride to said reaction product mixture under conditions effective for reaction of the poly-p-dioxanone with the cyclic anhydride to form an end-capped poly-p-dioxanone;
    (c) exposing the reaction product mixture to a temperature within the range of about 50 to about 150° C. under less than atmospheric pressure and removing unreacted p-dioxanone from the reaction product mixture; and (d) recovering the end-capped poly-p-dioxanone.

2. The process of claim 1 in which the cyclic anhydride is selected from the group consisting of cycloaliphatic anhydrides and aromatic anhydrides.

3. The process of claim 1 in which the cyclic anhydride is pyromellitic anhydride.

4. The process of claim 1 in which the cyclic anhydride is added to the reaction product mixture in an amount within the range of about 0.0001 to about 2 mole percent, based on p-dioxanone.

5. The process of claim 1 in which step (a) is carried out at a temperature greater than 110° C.

6. The process of claim 1 in which step (a) is carried out at a pressure within the range of about 0.05 to about 5 atm.

7. The process of claim 1 in which the poly-p-dioxanone is a copolymer of p-dioxanone and a second cyclic lactone.

8. The process of claim 1 in which the molecular weight of the poly-p-dioxanone is within the range of about 50,000 to about 300,000.

9. The process of claim 1 in which the polymerization catalyst comprises at least one of a tin compound, a zinc compound and an aluminum compound.

10. The process of claim 6 in which said second cyclic lactone is selected from at least one of lactide and glycolide.

11. The process of claim 1 which further comprises recycling the unreacted p-dioxanone from step (c) to the reaction mixture of step (a).

* * * * *